(12) United States Patent
Kleman

(10) Patent No.: US 10,948,332 B2
(45) Date of Patent: Mar. 16, 2021

(54) RADAR LEVEL GAUGE WITH DISCONNECTION OF ENERGY STORE

(71) Applicant: Rosemount Tank Radar AB, Mölnlycke (SE)

(72) Inventor: Mikael Kleman, Ulrika (SE)

(73) Assignee: ROSEMOUNT TANK RADAR AB, Molnlycke (SE)

( * ) Notice: Subject to any disclaimer, the term of this patent is extended or adjusted under 35 U.S.C. 154(b) by 771 days.

(21) Appl. No.: 15/349,062

(22) Filed: Nov. 11, 2016

(65) Prior Publication Data
US 2018/0136028 A1 May 17, 2018

(51) Int. Cl.
| | |
|---|---|
| G01F 23/284 | (2006.01) |
| G01S 7/35 | (2006.01) |
| G01S 13/34 | (2006.01) |
| G01S 13/10 | (2006.01) |

(52) U.S. Cl.
CPC .............. *G01F 23/284* (2013.01); *G01S 7/35* (2013.01); *G01S 13/343* (2013.01); *G01S 13/10* (2013.01)

(58) Field of Classification Search
CPC ........ G01F 23/284; G01S 7/35; G01S 13/343; G01S 13/10
See application file for complete search history.

(56) References Cited

U.S. PATENT DOCUMENTS

| | | | | | |
|---|---|---|---|---|---|
| 4,131,889 | A | * | 12/1978 | Gray ....................... | G01S 13/56 342/114 |
| 4,400,976 | A | * | 8/1983 | Blades .................. | G01F 23/296 367/903 |
| 4,502,454 | A | * | 3/1985 | Hamai .................... | F02P 3/051 123/406.65 |
| 4,820,999 | A | * | 4/1989 | Csanky .................. | H03F 1/223 330/277 |
| 5,465,094 | A |   | 11/1995 | McEwan | |
| 5,864,225 | A | * | 1/1999 | Bryson .................... | G05F 1/575 307/18 |
| 6,014,100 | A |   | 1/2000 | Fehrenbach et al. | |
| 6,459,175 | B1 | * | 10/2002 | Potega .................. | B60L 11/185 307/149 |

(Continued)

OTHER PUBLICATIONS

Notification of Transmittal of the International Search Report and the Written Opinion of the International Searching Authority from PCT/EP2017/078182, dated Feb. 15, 2018.

*Primary Examiner* — Erin F Heard
*Assistant Examiner* — Donald H B Braswell
(74) *Attorney, Agent, or Firm* — Westman, Champlin & Koehler, P.A.

(57) ABSTRACT

A radar level gauge comprising transceiver circuitry, a propagation device and processing circuitry for determining a value of the process variable based on a relationship between a transmit signal and a return signal. The gauge has a DC/DC converter connected to a power supply interface, and configured to convert a first voltage to a second voltage, lower than the first voltage, and an energy storage. The gauge further has a switch, connected between the DC/DC converter and the energy storage, the switch having a non-conducting state for disconnecting the energy storage from the DC/DC converter when the transceiver circuitry is active, and a conducting state for connecting the energy storage to the DC/DC converter only when the transceiver circuitry is inactive.

35 Claims, 2 Drawing Sheets

(56) References Cited

U.S. PATENT DOCUMENTS

| | | |
|---|---|---|
| 6,763,049 B1 | 7/2004 | Bees |
| 7,372,397 B2 | 5/2008 | Nilsson |
| 8,049,371 B2 | 11/2011 | Michalski |
| 2012/0169528 A1 | 7/2012 | Edvardsson et al. |
| 2013/0169468 A1* | 7/2013 | Johnson .................. G01S 13/02 342/41 |
| 2013/0334881 A1* | 12/2013 | Jones ........................ H02J 4/00 307/23 |
| 2015/0116142 A1 | 4/2015 | Jirskog |
| 2015/0253175 A1* | 9/2015 | Jirskog ................ G01F 23/284 342/58 |
| 2017/0271904 A1* | 9/2017 | Ziv ........................... H02J 3/00 |
| 2018/0213626 A9* | 7/2018 | Recker .................. H05B 47/10 |

* cited by examiner

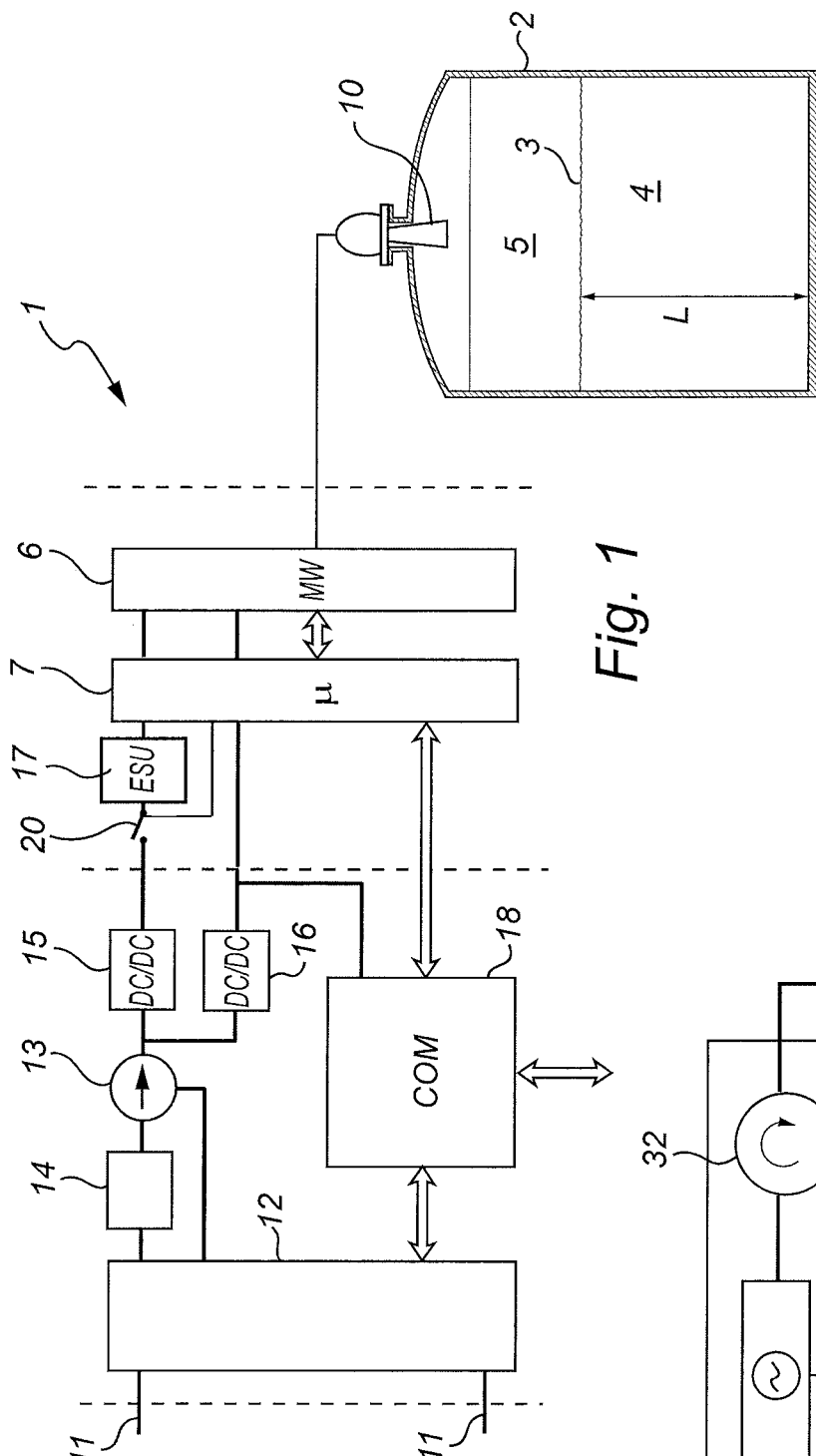

RADAR LEVEL GAUGE WITH DISCONNECTION OF ENERGY STORE

FIELD OF THE INVENTION

The present invention relates to radar level gauges for measuring a process variable of a product in a tank. In particular, it relates to power supply of transceiver circuitry of such level gauges.

BACKGROUND OF THE INVENTION

In many radar level gauging applications, the generation and processing of radar signals will typically consume more power than the intended power source can deliver continuously. This is particularly true for FMCW (frequency modulated continuous wave) radar techniques, although other high accuracy radar level measurement techniques may involve similar constraints.

Many field devices are powered via a two wire current loop, providing a voltage within a specified range at a current within a specified range. In some two-wire current loops, the current in the loop is used to indicate level being sensed by the RLG, wherein the lower end of the range is the most difficult case for powering the RLG. One example of such a current loop is the 4-20 mA loop, where the current is in the range 4-20 mA.

In other cases the gauge is powered by a local energy source such as a battery pack. This is for example the case for wireless radar level gauges. The local power source will have peak current limitations (possibly expressed alternatively as peak power limitations). In addition, a local energy store can only deliver a limited total energy before it needs recharging or replacing.

In both these cases, power by two-wire loop or battery, and possibly also in additional cases, specific power management schemes and structures are required to enable full functionality despite the restrictions in power supply. One commonly used solution is intermittent generation of radar signals, thus allowing energy to be stored in an energy storage unit whenever there is no signal generation.

In a radar level gauge, a DC/DC converter is typically used to convert the voltage from the power supply (e.g. a two-wire interface or a battery) to the required (lower) internal voltages in the field device. In order to keep power consumption at a minimum, it is typically necessary to use a high efficient DC/DC converter (e.g. around 90% efficiency). A problem with such converters is that they are rather noisy and will induce disturbances in the sensitive analog circuitry of the transceiver circuitry. If the field device is an intrinsically safe system, this problem is accentuated by the fact that effective capacitive filtering to remove such noise is difficult as there is a limit to how much capacitance is allowed.

One specific situation relates to a radar level gauge operating according to the FMCW (frequency modulated continuous wave). In such a gauge, the switching frequencies of the DC/DC converter may also interfere with the intermediate frequency (IF) signal in the radar level gauge.

Low-noise DC/DC converters are known in the art. However, such converters are less power efficient (e.g. 50-80%). Therefore, in a situation with limited power supply as explained above, such converters cannot be used for the entire system without sacrificing measurement performance in the form of measuring rate, bandwidth (sweep length) or signal processing capabilities.

In situations where there is no DC/DC converter, other components may cause noise which may interfere with the transceiver circuitry.

Thus, it would be desirable to avoid negative influence from noise caused by high efficiency DC/DC converters and other components.

GENERAL DISCLOSURE OF THE INVENTION

It is an object of the present invention to overcome the above drawbacks, and avoid disturbance of sensitive analogue circuitry in a radar level gauge caused by a DC/DC converter or other components.

According to a first aspect of the present invention, this and other objects are achieved by a radar level gauge for measuring a process variable of a product in a tank, the radar level gauge comprising transceiver circuitry for generating and transmitting an electromagnetic transmit signal, and for receiving an electromagnetic return signal, a propagation device connected to the transceiver circuitry and arranged to allow the electromagnetic transmit signal to propagate towards a surface of the product, and to return an electromagnetic return signal caused by a reflection of the electromagnetic transmit signal in the surface, processing circuitry for determining a value of the process variable based on a relationship between the transmit signal and the return signal, a power supply interface providing operating power from a power supply to the radar level gauge at a first voltage, a DC/DC converter connected to the power supply and configured to convert the first voltage to a second voltage, lower than the first voltage, an energy storage configured to provide power to the transceiver circuitry when the transceiver circuitry is active, and to store power when the transceiver circuitry is inactive, and a switch, connected between the DC/DC converter and the energy storage, the switch having a non-conducting state for disconnecting the energy storage from the DC/DC converter when the transceiver circuitry is active, and a conducting state for connecting the energy storage to the DC/DC converter only when the transceiver circuitry is inactive.

According to a second aspect of the present invention, this and other objects are achieved by a radar level gauge for measuring a process variable of a product in a tank, the radar level gauge comprising transceiver circuitry for generating and transmitting an electromagnetic transmit signal, and for receiving an electromagnetic return signal, a propagation device connected to the transceiver circuitry and arranged to allow the electromagnetic transmit signal to propagate towards a surface of the product, and to return an electromagnetic return signal caused by a reflection of the electromagnetic transmit signal in the surface, processing circuitry for determining a value of the process variable based on a relationship between the transmit signal and the return signal, an internal power supply providing operating power to the radar level gauge at a first voltage, an energy storage connected to the first voltage and configured to provide power to the transceiver circuitry when the transceiver circuitry is active, and to store power when the transceiver circuitry is inactive, a linear voltage regulator connected to the first voltage, and configured to convert the first voltage to a second voltage, lower than the first voltage, communication circuitry connected to the second voltage, the communication circuitry configured for communicating externally to the radar level gauge, and a switch, connected between the linear voltage regulator and the energy storage, the switch having a non-conducting state for disconnecting the energy storage from the first voltage when the transceiver circuitry is active, and a conducting state for connecting the energy storage to the first voltage only when the transceiver circuitry is inactive.

According to a third aspect of the present invention, this and other objects are achieved by a method for measuring a process variable of a product in a tank, the method comprising the steps of transmitting, using transceiver circuitry, an electromagnetic transmit signal, allowing the electromagnetic transmit signal to propagate towards a surface of the product, receiving, using the transceiver circuitry, an electromagnetic return signal caused by a reflection of the electromagnetic transmit signal in the surface, determining a value of the process variable based on a relationship between the transmit signal and the return signal, providing operating power to the radar level gauge at a first voltage, converting the first voltage to a second voltage, lower than the first voltage, using a DC/DC converter, powering transceiver circuitry from an energy storage when the transceiver circuitry is active, and storing power in the energy storage when the transceiver circuitry is inactive, disconnecting the energy storage from the DC/DC converter when the transceiver circuitry is active, and connecting the energy storage to the DC/DC converter only when the transceiver circuitry is inactive.

According to a fourth aspect of the present invention, this and other objects are achieved by a method for measuring a process variable of a product in a tank, the method comprising generating and transmitting an electromagnetic transmit signal, allowing the electromagnetic transmit signal to propagate towards a surface of the product, receiving an electromagnetic return signal caused by a reflection of the electromagnetic transmit signal in the surface, determining a value of the process variable based on a relationship between the transmit signal and the return signal, providing operating power to the radar level gauge at a first voltage, storing energy in an energy storage when the transceiver circuitry is inactive and providing power to the transceiver circuitry from the energy storage when the transceiver circuitry is active, converting the first voltage to a second voltage, lower than the first voltage, using a linear voltage regulator, communicating externally to the radar level gauge using communication circuitry powered by the second voltage, and disconnecting the energy storage from the first voltage when the transceiver circuitry is active, and connecting the energy storage to the first voltage only when the transceiver circuitry is inactive.

The invention is based on the realization that when a radar level gauge is provided with an energy storage for temporarily powering the transceiver circuitry and processing circuitry, such energy storage may be disconnected from the power supply (and any other components) during intermittent operation of this circuitry (typically during a measurement sweep). Noise from power supply circuitry and/or communication circuitry will thus not reach the transceiver circuitry when it is active. The energy store may subsequently be charged when the transceiver circuitry is idle (i.e. between measurement sweeps).

For example, when the power supply circuitry includes a DC/DC converter, any noise from the converter is effectively prevented from disturbing the sensitive analog circuitry. This may improve a ratio between signals and internally generated noise by several dB, possibly more than 10 dB.

A measurement sweep is typically short, the transceiver circuitry is typically not active for periods longer than 20 ms, normally no more than 10 ms. Further, a typical measurement repetition rate is one measurement sweep per second. From this follows that the "duty cycle" of the transceiver circuitry is less than 10%, typically much less, possible close to 1%. With such limited duty cycle, disconnection of the power supply when the transceiver circuitry is active will not significantly impair the charging of the energy storage.

The switch may be configured to galvanically separate the energy store from the DC/DC converter or voltage regulator. However, galvanic separation typically requires physical separation, and in practice such separation is not feasible considering the limited power available. Instead, the switch is typically configured to provide, in its non-conducting state, a separation by a very large, but finite, impedance. As an example, such impedance may be in the order of MOhm, e,g, more than one MOhm or more than two MOhm.

An example of a suitable switching element is a Field Effect Transistor (FET), which has a number of suitable features, such as low resistance when in conducting state and very limited current required for controlling it.

The switch may be connected to and controlled by the processing circuitry. The processing circuitry can control the switch based on timing of the intermittent operation of the transceiver circuitry, i.e. when the measurement sweeps take place.

The power supply may be internal to the radar level gauge. By "internal" is typically meant that the power supply is arranged within the mechanical housing of the radar level gauge. However, a stand-alone power supply, such as a portable battery, could also be referred to as an "internal" power supply, in the sense that power is not supplied from a location remote from the radar level gauge.

Alternatively, the power supply is external to the gauge. With "external" is intended to mean that the source of power is remotely located, and that the power supply includes some kind of power supply medium to transfer power from the power source to the radar level gauge.

For example, the power supply may be a two wire current loop. In this case, the power supply interface may be arranged to draw a supply current equal to a predefined bus current, or arranged to draw a supply current representative of the detected value. An widely used example of the latter case is a 4-20 mA current loop.

The power supply interface may further be configured as a field bus interface, and arranged to communicate digitally over the two wire current loop. Such communication may be provided instead of, or in combination with, communication of a measurement value as a supply current level.

As an alternative to communication using a two wire current loop, the radar level gauge may communicate measurement data wirelessly to a remote location.

Regardless of the type of communication (4-20 mA, field bus, wireless, or other) the radar level gauge may be provided with communication circuitry for communicating measurement data externally to the radar level gauge.

The second voltage, provided by the DC/DC converter, is preferably adapted to provide efficient energy storage in the energy storage. In general, this suggests a voltage level as high as possible, e.g. considering IS (internal safety) requirements. As a consequence, the second voltage may be too high to power such circuitry that needs to be powered also when the transceiver circuitry is inactive. Such circuitry may include (parts of) the processing circuitry as well as any communication circuitry.

For this reason, the radar level gauge may be provided with a further DC/DC converter, connected to the power supply and configured to convert the first voltage to a third voltage, lower than said second voltage, wherein the further DC/DC converter is connected to provide power to the processing circuitry, and possibly to any communication circuitry. It is noted that this further DC/DC converter may provide power from the power supply at all times. However, as this further DC/DC converter does not supply any parts of the sensitive analogue circuits in the transceiver circuitry, any noise from this further DC/DC converter will not disturb these circuits.

The transceiver circuitry may include circuitry for generating a frequency modulated microwave sweep signal, suitable for FMCW processing. In this case, the transceiver circuitry may also include circuitry for mixing the transmit signal with the return signal, in order to provide an intermediate frequency (IF) signal. Further, the transceiver circuitry may include circuitry for sampling the IF signal and provide a digital output.

BRIEF DESCRIPTION OF THE DRAWINGS

The present invention will be described in more detail with reference to the appended drawings, showing currently preferred embodiments of the invention.

FIG. 1 is a schematic block diagram of a radar level gauge according to a first embodiment of the present invention.

FIG. 2 is a schematic block diagram of some parts of the transceiver circuitry in FIG. 1.

DETAILED DESCRIPTION OF PREFERRED EMBODIMENTS

Figure 3:
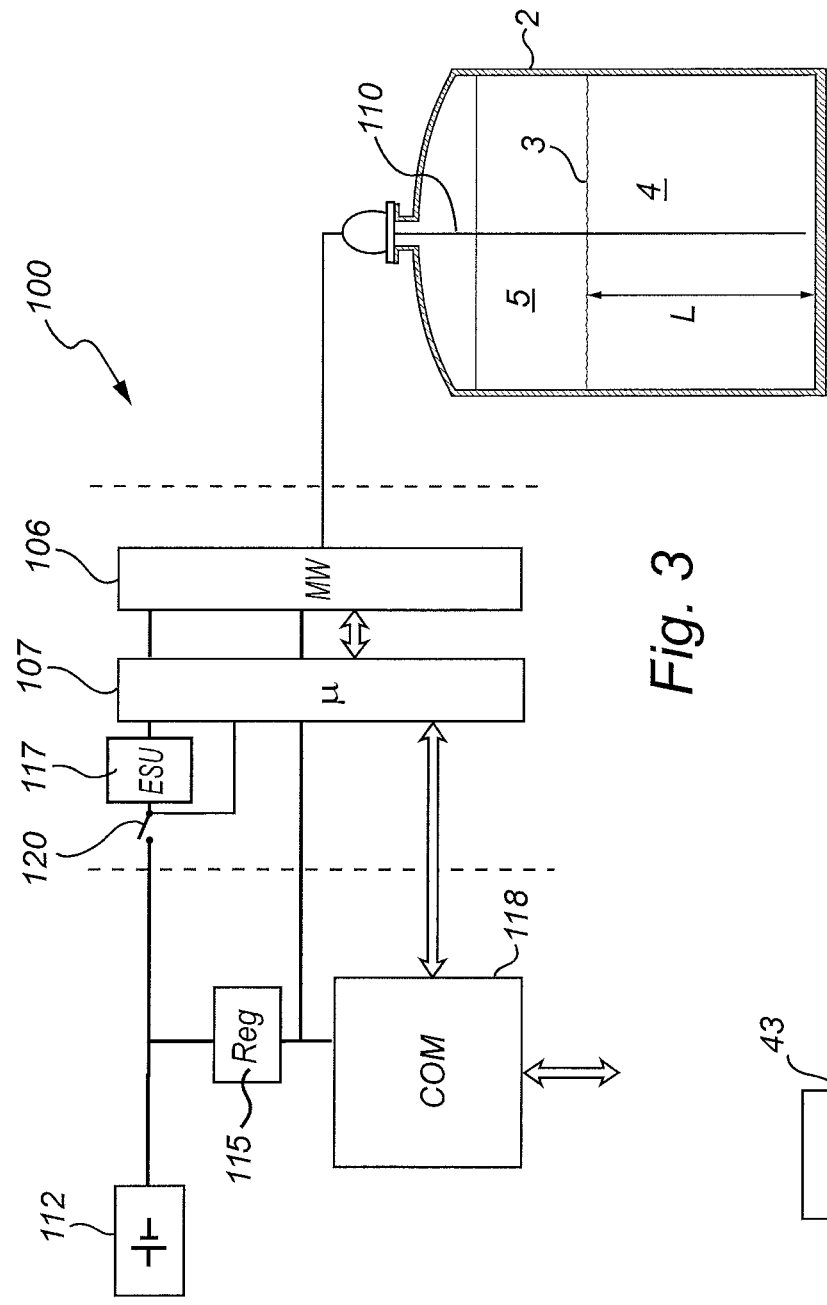
FIG. 3 is a schematic block diagram of a radar level gauge according to a second embodiment of the present invention.

FIG. 1 shows a schematic block diagram of a radar level gauge (RLG) 1 according to an embodiment of the present invention. The RLG 1 is mounted on a tank 2, and arranged to perform measurements of a process variable such as the level L of an interface 3 between two materials 4, 5 in the tank 2. Typically, the first material is a liquid 4 stored in the tank, e.g. gasoline, while the second material is air or other atmosphere 5 in the tank.

The radar level gauge 1 includes transceiver circuitry 6, processing circuitry 7. The transceiver circuitry 6 is configured to generate and transmit an electromagnetic transmit signal, and to receive an electromagnetic return signal. The processing circuitry is configured to determine the process variable based on a relationship between the transmit signal and the return signal.

The transceiver circuitry 6 is electrically connected to a suitable signal propagation device, here a directional antenna 10. The antenna 10 is arranged to allow the electromagnetic transmit signal to propagate towards a surface of the product 4, and to return an electromagnetic return signal caused by a reflection of the electromagnetic transmit signal by the interface, here the surface 3 of the product 4 in the tank 2.

When the signal propagation device is a free propagating directional antenna (as in FIG. 1), the RLG is referred to as "non-contact" radar. Sometimes the antenna is coupled to a wave guiding structure in the form of a pipe (referred to as a "still pipe") in order to reduce interference and to ensure a calm surface.

The signal propagation device may also be a probe (see FIG. 3), i.e. a transmission line extending into the content of the tank. In this case the transmit signal and echo signal will propagate along the probe until they are reflected by the impedance discontinuity caused by the surface 3. An RPG with a probe is sometimes referred to as guided wave radar (GWR). Several types of probes, for example single-line (Goubau-type), coaxial, and twin-line probes may be used. The probes may be essentially rigid or flexible and they may be made from metal, such as stainless steel, plastic, such as PTFE, or a combination thereof.

The transmit signal is typically in the GHz range, e.g. around 6 GHz or 26 GHz. It may be a continuous signal with varying frequency (frequency modulated continuous wave, FMCW), or it can be a modulated pulse. Also other types of transmit signals are possible.

FIG. 2 shows an example of a transceiver 6 for a radar level gauge operating according to the FMCW principle. The transceiver 6 here includes a microwave source 31 for generating and transmitting a transmit signal in the form of a continuous frequency sweep. The transmit signal is connected to the antenna 10 via a circulator (or power divider) 32, which is configured to separate the transmit signal from a return signal received by the antenna 10 and returned to the transceiver. Further, the transceiver 6 comprises a mixer 33 for mixing the transmit signal with the return signal in order to generate an intermediate frequency (IF) signal, and a sampler (A/D-converter) 34 for sampling and A/D converting the IF signal. The digital output from the sampler 34 is connected to the digital processing circuitry 7.

As will be discussed in the following, the RLG 1 is further provided with a power supply interface 12 and communication circuitry 18.

In FIG. 1, the power supply interface is connected to a two-wire current loop 11, sometimes referred to as a two-wire control loop. The power supply interface 12 draws a loop current from the current loop 11 at the loop voltage, here referred to as a first voltage V1. In a typical application, the first voltage V1 available on the current loop is around 10 V, for example 8 V.

One example of a two wire current loop is a 4-20 mA loop, in which case the drawn current is representative of the measured value (measurement data from the gauge). In this case, the current drawn from the loop 11 by the interface 12, and thus also the available power, will vary. However, the gauge must be capable of operating also when the loop current is at its minimum (4 mA). Sometimes such analogue communication is combined with digital field bus communication superimposed on the loop voltage. The most commonly used protocol used for such communication is HART.

Alternatively, the current loop 11 provides a predefined (fixed) current level. In this case, communication of measurement data is provided by other means. In one example, the power interface 12 also serves as a field bus interface, and provides digital field bus communication on the current loop. Foundation Fieldbus is an example of a digital protocol used for this purpose. In another example, the gauge is configured to communicate measurement data by wireless communication. Wireless HART is an example of a wireless communication protocol.

In the illustrated example, the current loop 11 is a 4-20 mA loop as discussed above. For this purpose, the communication module 18 is connected to the power supply interface 12. The power supply interface 12 is in turn connected to a current source 13. The current source 13 is here preceded by a voltage regulator 14. It is noted that the communication module 18 may also provide a user interface, and/or provide wireless communication as discussed above.

The output of the current source 13 is connected to a first DC/DC converter 15. The first DC/DC converter 15 is configured to convert a first voltage received from the current source 13 to a second voltage V2, lower than the first voltage. This second voltage is used to power the processing circuitry 7 and transceiver circuitry 6, in particular those parts of the circuitry 6, 7 which operates intermittently.

While active, the processing circuitry 7 and the transceiver circuitry 6 has a relatively high power consumption and it is therefore advantageous to provide the RLG with an energy storage unit 17, connected between the first DC/DC converter 15 and the circuitry 6, 7. The output voltage of the energy storage unit 17 will be the operating voltage of the transceiver circuitry, and is typically a few Volts. As an example, it may be 2.5 V.

In order to make the energy storage in the ESU 17 as efficient as possible, the second voltage provided by the DC/DC converter 15 is as high as the IS-safety regulation will allow. In a typical application, the second voltage V2 is a few volts lower than the first voltage, and as a specific example it may be 5.4 V.

The second voltage V2 is therefore typically too high to power those parts of the circuitry which are not sensitive, and which need power also outside the sweep. Such circuitry includes e.g. digital parts of the processing circuitry 7 and any communication circuitry 18. To provide such voltage, a second DC/DC converter 16 (possibly in series with a voltage regulator, such as a low-noise low drop out (LDO) regulator), is provided to convert the first voltage received from the current source 13 to a third voltage V3, lower than the second voltage. The DC/DC converter 16 is connected to power the processing circuitry 6 and communication circuitry 18 respectively. As indicated in FIG. 1, it is possible that this second DC/DC converter also powers some, less sensitive parts of the transceiver circuitry 6. The third voltage V3 provided by the second DC/DC converter 16 will therefore typically be the same as the operating voltage provided by the ESU 17. As mentioned above, this is typically a few Volts, and may, as an example, be 2.5 V.

In use, the communication module 18 determines the desired loop current representative of the measurement value determined by the processing circuitry 7. The interface 12 then controls the current through the current source 13 to ensure this loop current.

The current that is drawn from the control loop 11 by the current source 13 is available for consumption by the circuitry in the RLG 1, including the processing circuitry 7 and the transceiver circuitry 6, as well as the communication circuitry 18. Whenever the current through the source 13 provides an excess of power, such excess may be shunted away to ground by a limiting shunt circuit (not shown) at the output of the source 13. The arrangement of the current source 13 "in series" with converters 15 and 16 gives the advantage that the load seen from the current loop is kept constant. This, in turn, helps limiting any noise in the current loop 11 created by the RLG circuitry. The regulator 14 has the function of limiting voltage input to the current source 13 in case of excessively high voltage on the current loop connection of the RLG.

According to the invention, a switch 20 is further connected between the DC/DC converter 15 and the ESU 17. The switch 20 is configured to disconnect the converter 15 from the ESU 17, thereby effectively preventing any noise from the DC/DC converter 15 to reach the sensitive circuits in the transceiver circuitry 6.

In its non-conducting state, the switch needs to provide sufficiently high impedance for effectively disconnecting the ESU 17 from the DC/DC converter. As an example, a suitable switching element may be a field effect transistor (FET), typically providing an impedance in the non-conducting state greater than 1 MOhm. In its conducting state, the switch preferably has very low resistance. Further, the switch preferably requires a very small current for control of the switch. A FET fulfills also these requirements.

The switch 20 is here connected to and controlled by the processing circuitry 7. The processing circuitry 7 is configured to control the switch 20 to disconnect the converter 15 from the ESU 17 whenever the (intermittent parts of) the transceiver circuitry 6 are active, and consequently connect the converter 15 from the ESU 17 only when the (intermittent parts of) the transceiver circuitry 6 are inactive. The processing circuitry 7 thus provides the switch 20 with appropriate timing associated with the intermittent operation of the transceiver circuitry.

It is possible that the switch will require a higher control voltage than what is available from the processing circuitry 7, and the switch may therefore be provided with suitable voltage level shifting circuitry. It is noted that the switch is typically selected such that very little current (and thus power) is required for the switching operation. The voltage shift can therefore be accomplished without (or with negligible) noise.

Typically, the sensitive, analogue parts of the transceiver circuitry (e.g. elements 31-34 discussed above) are only active during the actual measurement sweep, i.e. when signals are transmitted, received, mixed and sampled. Such a sweep may be as short as 10 ms, or even shorter. Measurements are typically performed once every second, indicating a duty cycle of the transceiver circuitry of only a few percent.

FIG. 3 shows a second embodiment of a radar level gauge according to the present invention. The tank and its contents is intended to be similar to the tank in FIG. 1, and will not be further described here. Similar to the RLG in FIG. 1, the RLG 100 in FIG. 3 comprises transceiver circuitry 106, processing circuitry 107, and a propagation device. The propagation device is here a probe 110, as was mentioned above. Just as the RLG 1 in FIG. 1, the RLG 100 may be configured to operate according to the FMCW principle. The operation of the RLG 100 is similar to that of the RLG in FIG. 1, and will not be further discussed here.

In FIG. 3, the radar level gauge 100 is powered by an internal, or local, power supply such as a battery 111. The power supply interface is in this case simply the output 112 of the battery 111, providing a supply voltage, here referred to as a first voltage V1. A linear voltage regulator 115 is connected to the battery 111, and provides a regulated voltage, here referred to as a second voltage V2, which is lower than the first voltage V1. The voltage regulator is connected to power the transceiver circuitry and processing circuitry via a temporary energy storage 117.

The radar level gauge 100 further has communication circuitry 118 for communicating a level value sensed by the gauge through wireless communication using a protocol such as WirelessHART. The communication circuitry is powered by the linear voltage regulator.

It is noted that the linear voltage regulator 115 is connected in a similar way as the DC/DC converter in FIG. 1, but the linear voltage regulator 115 does not generate as much noise as the DC/DC converter 15. However, although the RLG 100 does not have a noisy DC/DC converter, like the RLG in FIG. 1, the communication circuitry 18 may generate noise which may cause interference of the sensitive analogue circuits in the transceiver circuitry 106. Therefore, a switch 120 is provided for disconnecting the ESU 117 from the linear voltage regulator when the transceiver circuitry 106 is active (i.e. typically during a measurement sweep). The properties and function of the switch 120 are similar as in FIG. 1, and will not be further discussed here.

Figure 4:
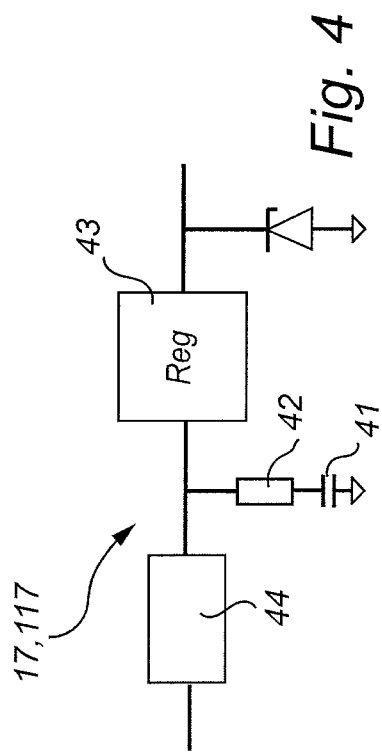
FIG. 4 is an schematic circuit diagram of an example of an energy storage unit suitable for the radar level gauges in FIGS. 1 and 3.

FIG. 4 shows an embodiment of the energy storage unit (ESU) 17, 117 in FIGS. 1 and 3. Here, it is assumed that a relatively simple energy storage unit can be used, using one or several capacitors 41 as energy storing component(s). It is locally protected through clamping and resistive spacing by a resistor 42 such that that the total capacity of the energy storage component(s) complies with requirements of standard IEC 61079-11. The energy storage in FIG. 4 is a simple "step-down" version, including a voltage regulator 43. The regulator may include a DC/DC converter depending on what efficiency is required. Contrary to the DC/DC converter 15 discussed above, any converter in the regulator 43 must be a low noise converter, as this component is always connected to the sensitive circuits in the transceiver 6, 106. Depending on the feeding arrangement of the ESU, there may or may not be a need for a charge limiter 44. Typically, if a current generator is arranged in series with the input of the ESU, as was the case in FIG. 1, no separate charge limiter 44 will be required.

The person skilled in the art realizes that the present invention by no means is limited to the preferred embodiments described above. On the contrary, many modifications and variations are possible within the scope of the appended claims. For example, another type of switch may be used instead of a FET. Further, the ESU may have a different design, and include other elements than what is shown in FIG. 4. Also, it is noted that the inventive concept of disconnecting the energy store when the transceiver circuitry is active will be advantageous also when internally generated interference has other sources than a DC/DC converter or communication circuitry.

What is claimed is:

1. A radar level gauge for measuring a process variable of a product in a tank, the radar level gauge comprising:
   transceiver circuitry for generating and transmitting an electromagnetic transmit signal, and for receiving an electromagnetic return signal,
   a propagation device connected to the transceiver circuitry and arranged to allow said electromagnetic transmit signal to propagate towards a surface of said product, and to return an electromagnetic return signal caused by a reflection of the electromagnetic transmit signal in the surface,
   processing circuitry for determining a value of said process variable based on a relationship between said transmit signal and said return signal,
   a power supply interface providing operating power from a power supply to said radar level gauge at a first voltage,
   a DC/DC converter connected to the power supply, and configured to convert said first voltage to a second voltage, wherein said second voltage is lower than said first voltage,
   an energy storage configured to provide power to the transceiver circuitry when the transceiver circuitry is active, and to store power when the transceiver circuitry is inactive, and
   a switch, connected between the DC/DC converter and the energy storage,
   wherein said switch is controlled by said processing circuitry based on intermittent operation of said transceiver circuitry such that said switch disconnects the energy storage from the DC/DC converter when the transceiver circuitry is active, and connects the energy storage to the DC/DC converter only when the transceiver circuitry is inactive.

2. The radar level gauge according to claim 1, wherein said switch in its non-conducting state has a finite impedance greater than 1 MOhm.

3. The radar level gauge according to claim 1, wherein said switch is connected to and controlled by the processing circuitry.

4. The radar level gauge according to claim 1, wherein said switch comprises a Field Effect Transistor (FET).

5. The radar level gauge according to claim 1, wherein said power supply is internal to said radar level gauge.

6. The radar level gauge according to claim 1, wherein said power supply is external to said radar level gauge.

7. The radar level gauge according to claim 6, wherein said power supply is a two wire current loop.

8. The radar level gauge according to claim 6, wherein the power supply interface is arranged to draw a supply current equal to a predefined bus current.

9. The radar level gauge according to claim 6, wherein the power supply interface is arranged to draw a supply current representative of the value of said process variable.

10. The radar level gauge according to claim 6, wherein said the power supply interface is further configured as a field bus interface, and arranged to communicate digitally over the two wire current loop.

11. The radar level gauge according to claim 1, further comprising communication circuitry for communicating measurement data externally to said radar level gauge.

12. The radar level gauge according to claim 11, wherein said the power supply interface is further configured as a field bus interface, and arranged to communicate digitally over a two wire current loop, and wherein the communication circuitry is configured to communicate over said field bus interface.

13. The radar level gauge according to claim 11, wherein the communication circuitry is configured to communicate wirelessly.

14. The radar level gauge according to claim 1, wherein said transceiver circuitry includes circuitry for generating a frequency modulated continuous wave (FMCW) sweep signal.

15. The radar level gauge according to claim 14, wherein said transceiver circuitry includes circuitry for mixing the transmit signal with the return signal, in order to provide an intermediate frequency (IF) signal.

16. The radar level gauge according to claim 15, wherein said transceiver circuitry includes circuitry for sampling the intermediate frequency (IF) signal.

17. The radar level gauge according to claim 1, wherein the transceiver circuitry has a duty cycle of less than 10%.

18. The radar level gauge according to claim 1, wherein the transceiver circuitry is only active during transmission, reception and sampling of analogue signals.

19. The radar level gauge according to claim 1, wherein the transceiver circuitry is active during less than 20 ms of a measurement cycle.

20. The radar level gauge according to claim 1, wherein the DC/DC converter has a power efficiency of at least 85%.

21. The radar level gauge according to claim 1, further comprising a further DC/DC converter, connected to said power supply and configured to convert said first voltage to a third voltage, lower than said second voltage, wherein said further DC/DC converter is connected to provide power to said processing circuitry.

22. A radar level gauge for measuring a process variable of a product in a tank, the radar level gauge comprising:
- transceiver circuitry for generating and transmitting an electromagnetic transmit signal, and for receiving an electromagnetic return signal,
- a propagation device connected to the transceiver circuitry and arranged to allow said electromagnetic transmit signal to propagate towards a surface of said product, and to return an electromagnetic return signal caused by a reflection of the electromagnetic transmit signal in the surface,
- processing circuitry for determining a value of said process variable based on a relationship between said transmit signal and said return signal,
- an internal power supply providing operating power to said radar level gauge at a first voltage,
- an energy storage connected to said first voltage and configured to provide power to the transceiver circuitry when the transceiver circuitry is active, and to store power when the transceiver circuitry is inactive,
- a linear voltage regulator connected to the first voltage, and configured to convert said first voltage to a second voltage, lower than said first voltage,
- communication circuitry connected to said second voltage, said communication circuitry configured for communicating measurement data externally of said radar level gauge, and
- a switch, connected between the linear voltage regulator and the energy storage, wherein said switch is controlled by said processing circuitry based on intermittent operation of said transceiver circuitry such that said switch disconnects the energy storage from the first voltage when the transceiver circuitry is active, and connects the energy storage to the first voltage only when the transceiver circuitry is inactive.

23. The radar level gauge according to claim 22, wherein said switch in its non-conducting state has a finite impedance greater than 1 MOhm.

24. The radar level gauge according to claim 22, wherein said switch is connected to and controlled by the processing circuitry.

25. The radar level gauge according to claim 22, wherein said switch comprises a Field Effect Transistor (FET).

26. The radar level gauge according to claim 22, wherein said internal power supply is a battery.

27. The radar level gauge according to claim 22, wherein the communication circuitry is configured to communicate wirelessly.

28. The radar level gauge according to claim 22, wherein said transceiver circuitry includes circuitry for generating a frequency modulated continuous wave (FMCW) sweep signal.

29. The radar level gauge according to claim 28, wherein said transceiver circuitry includes circuitry for mixing the transmit signal with the return signal, in order to provide an intermediate frequency (IF) signal.

30. The radar level gauge according to claim 29, wherein said transceiver circuitry includes circuitry for sampling the intermediate frequency (IF) signal.

31. The radar level gauge according to claim 22, wherein the transceiver circuitry has a duty cycle of less than 10%.

32. The radar level gauge according to claim 22, wherein the transceiver circuitry is only active during transmission, reception and sampling of analogue signals.

33. The radar level gauge according to claim 22, wherein the transceiver circuitry is active during less than 20 ms of a measurement cycle.

34. A method for measuring a process variable of a product in a tank, the method comprising the steps of:
- transmitting, using transceiver circuitry, an electromagnetic transmit signal,
- allowing said electromagnetic transmit signal to propagate towards a surface of said product,
- receiving, using said transceiver circuitry, an electromagnetic return signal caused by a reflection of the electromagnetic transmit signal in the surface,
- determining a value of said process variable based on a relationship between said transmit signal and said return signal,
- providing operating power at a first voltage,
- converting said first voltage to a second voltage, lower than said first voltage, using a DC/DC converter,
- powering transceiver circuitry from an energy storage when the transceiver circuitry is active, and storing power in the energy storage when the transceiver circuitry is inactive, and
- based on intermittent operation of said transceiver circuitry, disconnecting the energy storage from the DC/DC converter when the transceiver circuitry is active, and connecting the energy storage to the DC/DC converter only when the transceiver circuitry is inactive.

35. A method for measuring a process variable of a product in a tank, the method comprising:
- generating and transmitting an electromagnetic transmit signal,
- allowing said electromagnetic transmit signal to propagate towards a surface of said product,
- receiving an electromagnetic return signal caused by a reflection of the electromagnetic transmit signal in the surface,
- determining a value of said process variable based on a relationship between said transmit signal and said return signal,
- providing operating power at a first voltage,
- storing energy in an energy storage when the transceiver circuitry is inactive and providing power to the transceiver circuitry from the energy storage when the transceiver circuitry is active,
- converting said first voltage to a second voltage, lower than said first voltage, using a linear voltage regulator,
- communicating externally to said radar level gauge using communication circuitry powered by said second voltage, and
- based on intermittent operation of said transceiver circuitry, disconnecting the energy storage from the first voltage when the transceiver circuitry is active, and connecting the energy storage to the first voltage only when the transceiver circuitry is inactive.

* * * * *